Patented May 29, 1951

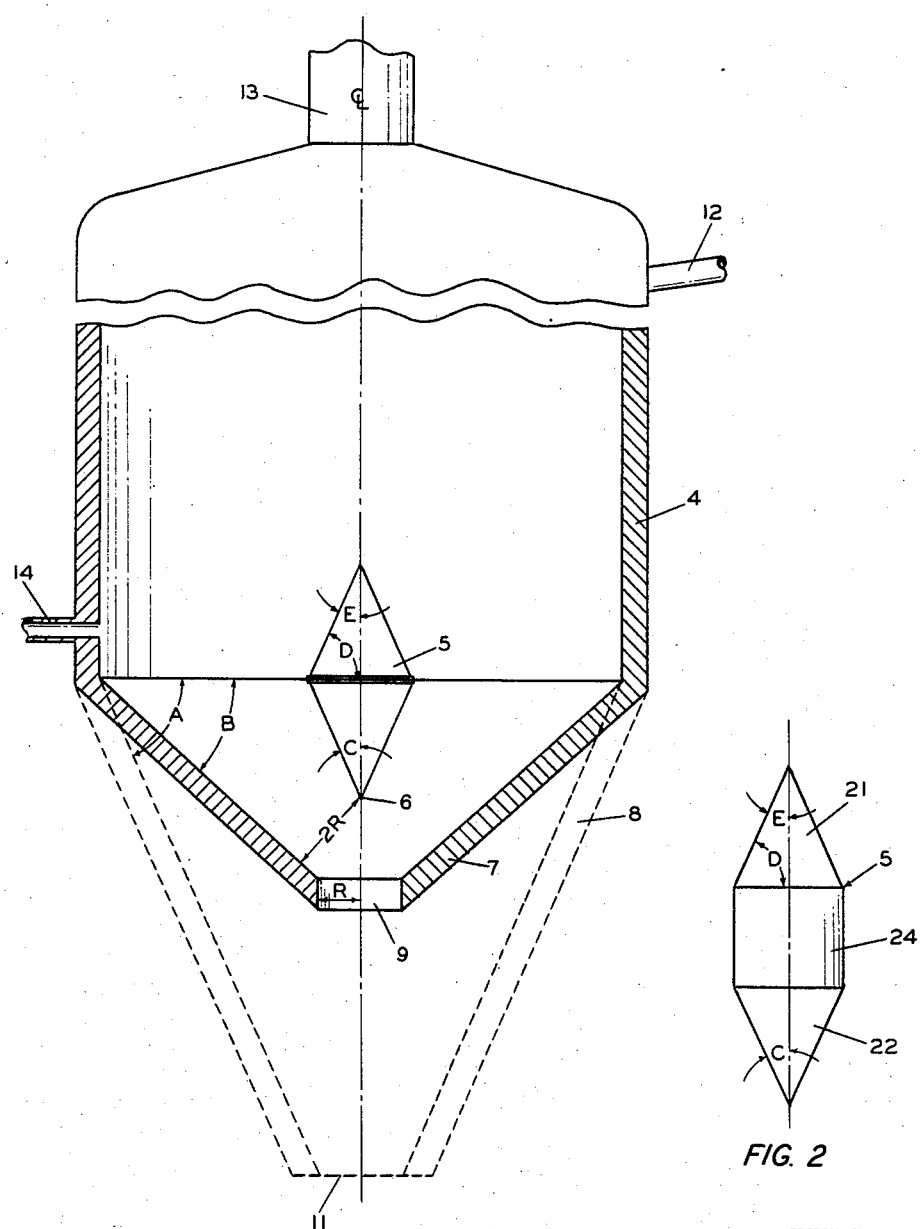

2,555,052

UNITED STATES PATENT OFFICE 2,555,052

METHOD OF EFFECTING CONTACT IN A PEBBLE HEATER

Harold H. Morse, Bartlesville, Okla., assignor to Phillips Petroleum Company, a corporation of Delaware Application July 29, 1946, Serial No. 686,963

4 Claims. (Cl. 260—677)

This invention relates to a contact chamber. In one aspect this invention relates to a chamber adapted to the continuous flow of granular substance therethrough. In another aspect this invention relates to a pebble deflecting device. In still another aspect this invention relates to the design of a chamber in a pebble heater type apparatus.

Recent advances in certain industrial processes, such as catalytic and thermal cracking, have introduced the use of moving solids as catalyst beds or as heat transfer media. In order that all the catalysts may be substantially uniformly and equally deactivated, or in the case of heat transfer media, that it may be uniformly and equally contacted with the reactant before being discharged from the contact vessel, it is desirable that the flow of solid particles through the reaction chamber be continuous and uniform. The contacting vessel usually comprises an upper cylindrical section and a lower conical bottom having a hole at the apex of the cone for the discharge of the solid particles. Unless a long, steep cone is used the flow of the solid particles will not be uniform. The solid particles, as they reach the level of the confluence of the sides with the conical bottom of the chamber, become at least partially stagnated. The rate of the flow of such particles at this point decreases and the residence time in the contact zone is thereby increased. In order to achieve uniform flow of the solid particles through the conical bottom, the angle of slope of the sides of the conical bottom must be at least equal to the dynamic angle of repose of the particular solid particles. If in conventional apparatus, the angle of slope of the bottom is less than the dynamic angle of repose of the particles, at least partial stagnation of the solid particles in the conical bottom of the chamber results. When this angle of slope is equal to the static angle of repose almost complete stagnation of some of the solid particles is effected. A long steep cone overcoming this difficulty is usually undesirable since it excessively increases the length of the contact vessel beyond that required. It is much to be desired, therefore, to design a reaction chamber having a pyramidal shaped bottom less steep than at present possible while at the same time assuring uniform and continuous flow of solid particles through the chamber.

It is therefore an object of this invention to provide a reaction chamber which ensures uniform and continuous flow of solid particles therethrough.

It is another object of this invention to shorten the length of a chamber required for continuous and uniform flow of a granular material therethrough.

Still another object of this invention is to ensure uniform heat content throughout the cross-sectional area of a reaction chamber through which a continuous mass of granular substance is flowing.

A further object of this invention is to prevent the overheating of solid particles flowing through a reaction chamber.

Another object of this invention is to prevent the stagnation and accumulation of pebbles in a pebble heater type apparatus.

Other objects and advantages will become apparent to those skilled in the art from the accompanying description and disclosure.

In the drawing

Figure 1 of the drawing diagrammatically illustrates apparatus of this invention, partially in cross section, adapted to the uniform flow of a granular substance therethrough.

Figure 2 of the drawing diagrammatically illustrates a modification of deflector member 5 of Figure 1.

In Figure 1 of the drawing numeral 4 indicates an upper cylindrical section or sides of a chamber and numeral 7 indicates a lower conical section or bottom of the chamber having downwardly and inwardly sloping sides. Preferably, section 4 comprises an elongated right circular cylindrical shell positioned vertically, having an upper inlet 13 for a granular substance and a gas outlet 12; however, sides 4 may be of any particular shape without departing from the scope of this invention. The base of the conical section 7 is in the same plane as the lower base of cylindrical section 4. Bottom 7 is preferably a centrally and circularly perforated regular cone. Numeral 9 indicates a circular opening at the apex of conical section 7, which opening is geometrically formed by the truncation of conical section 7 with a horizontal plane. A deflecting member 5 preferably comprises two regular and opposite cones having a common base. The conical shaped member 5 is concentrically positioned in the chamber of Figure 1 in such a manner that the common base of the cones lies in a plane formed by the intersection of sides 4 and bottom 7. Apex 6 of the lower or depending cone is located such that its distance from bottom 7 is at least equal to the diameter of opening 9.

Section 8 shown in broken lines represents the shape of the conical bottom of a conventional chamber. Numeral 11 indicates the opening at the lower end of conical bottom 8. It should be noted that in constructing the apparatus in the manner described in this invention, conical bottom 7 is much shorter than conventional conical bottom 8, conical bottom 7 has an angle of slope at least equal to the static angle of repose and less than the dynamic angle of repose of the granular substance passing through the chamber while conventional conical bottom 8 has an angle of slope at least equal to the dynamic angle of repose.

In order that the length of the conical section 7 of the chamber of Figure 1 may be substantially shortened in comparison to conventional construction, it is necessary that the deflecting member 5 be constructed in particular manner. It has been found that conical bottom 7 should be constructed such that angle B (the angle of slope) is substantially equal to the static angle of repose of the granular substance flowing through the reaction chamber. The static angle of repose may be defined as the angle of repose of any material with the horizontal at which the material will stand when piled. Angle B must be at least equal to this static angle of repose of the material flowing through the reaction chamber. Angle B may be increased until it is equal to angle A which is the minimum angle of slope for the conventional conical section 8. In the conventional bottom 8, angle A (the angle of slope) must be at least equal to the dynamic angle of repose of the material flowing through the chamber. The dynamic angle of repose may be defined as the angle between the horizontal and the slope of a uniformly flowing cone in a compact bed of particulate granular material packed into a cylinder to a height of at least 1½ chamber diameters and freely flowing out a central opening in the bottom thereof. The cone referred to has its vertex in the outlet of the cylinder and includes that section of the bed from which pebbles in any horizontal section move substantially uniformly toward the outlet. Outside of the central dynamic cone is an increasingly stagnant zone extending from the dynamic cone on the inside to an outer boundary in the shape of a cone which is determined by the rotation of a line representing the static angle of repose of the particulate material. Outside this static cone boundary is an area of complete stagnation or quiescence. Since, according to this invention, the angle of slope B of the conical bottom 7 is less than the angle of slope A of the conventional bottom 8, the length of the bottom section of the chamber is substantially shortened.

The flow of the material through such a reaction chamber is directly affected by the diameter of opening 9 as well as its area. In this respect it has been found that in order to obtain uniform and continuous flow, the diameter (2R) of opening 9 should be at least 6 and preferably at least 8 times the average diameter of the granular substance flowing through the chamber. Using an opening with the diameter less than 6 to 8 times the diameter of the particles results in irregular flow. However, limiting the slope of conical bottom 7 and the size of opening 9 does not in itself achieve continuous and uniform flow unless deflecting member 5 is constructed in relation to the limitations of opening 9 and conical bottom 7. It is extremely difficult if not impossible to prevent at least partial stagnation of the granular substance in the bottom of the chamber unless the construction of the slope of bottom 7, the size of opening 9 and deflecting member 5 are coordinated in the manner described hereinafter.

The size of element 5 is determined by locating the apex 6 of the lower cone on the axis of the reaction chamber at a distance of at least the diameter (2R) of opening 9 from conical section 7 and making the acute angle C formed at apex 6 of the cone between the side and axis thereof at least equal to the complement of the dynamic angle of repose and not greater than the complement of the static angle of repose of the granular substance passing through the chamber. For a material having a static angle of repose of 34° and a dynamic angle of repose of 71° this means that the vertex angle of the cone lies in the range of 38 to 112°, but preferably is an angle of 38° for best flow characteristics. The base of the lower cone of element 5 lies in a plane formed by the intersection of bottom 7 and sides 4 and from this base an upper cone is constructed similar to lower cone with angle E similar to angle C, i. e., at least equal to the complement of the dynamic angle of repose of the granular material. Acute angle D, formed between side of the conical section 5 and its base is not greater than and preferably equal to approximately the dynamic angle of repose of the granular substance.

Figure 2 diagrammatically illustrates a modification of element 5 of Figure 1. In this modification element 5 is so constructed that it has a circular cylindrical mid-section 24 and two conical end sections 21 and 22. The size of element 5 of Figure 2 is determined in a similar manner to element 5 of Figure 1. In Figure 2 the diameter of cylindrical section 24 is a controlling factor in the design of element 5. The diameter of cylindrical section 24 is determined by locating the apex of the lower cone 22 on the axis of the reaction chamber at a distance from conical bottom 7 equal to at least the diameter of opening 9 in conical bottom 7, lower cone 22 having angle C at least equal to the complement of the dynamic angle of repose and not greater than the complement of the static angle of repose of the granular substance and having its base in the plane formed by the intersection of sides 4 and bottom 7 of Figure 1. The diameter of the base of the lower cone 22 is also the diameter of the cylindrical mid-section 24. Angle D (the angle of slope) of upper and lower cones 21 and 22 is not greater than, and preferably equal to, the dynamic angle of repose of the granular substance. Angle E of cone 21 is the complement of angle D of cone 21.

In another modification of this invention the enclosed conical shaped element 5 may comprise a circular, and preferably flat, disc. When element 5 is a disc disposed centrally and above opening 9 in a plane formed by the intersection of sides 4 and bottom 7, its area is substantially such that a depending closed volume generated by a line moving around said area having a slope not greater than, and preferably equal to, the dynamic angle of repose of the granular substance will at its lowest point be at least the same distance from bottom 7 as the diameter of opening 9.

It is also possible that only a single cone may be used as element 5; thus either the lower cone or the upper cone may be all that is necessary. In either case, it is necessary that the diameter of the base of element 5 be such that the apex of a depending cone generated by a line having a slope not greater than the dynamic angle of repose moved around the base will be at least a distance from bottom 7 equal to to the diameter of opening 9. The apex 6 of the conical shaped element 5 is not necessarily pointed but may be rounded as desired and as convenient.

The size and shape of the two end sections of element 5 of Figures 1 and 2 may be varied over a wide range and the end sections need not be the same in size but it is essential that the area of the base of element 5 be determined by the method described. Element 5 may be supported in the chamber of Figure 1 by any known method, such as by supporting rods (not shown).

Operation

In the operation of the apparatus shown in Figure 1, pebbles or granules are passed through inlet 13 into cylindrical section 4 of the reaction chamber. These pebbles accumulate in the reaction chamber to the desired height, usually about three-quarters or more of the height of the cylindrical section 4. The pebbles flow uniformly through cylindrical section 4 into the lower conical bottom section 7 where they are deflected outwardly from the center by element 5. As the result of the outward deflection of the pebbles from the center of the reaction chamber by element 5, the pebbles flow uniformly and continuously without stagnation to opening 9. Flue gas or gas to be treated is introduced into the reaction chamber of Figure 1 through inlet conduit 14 and may be withdrawn through outlet conduit 12. In some instances, particularly in the conversion of hydrocarbons, it is preferable to introduce the flue gas or reactant gas into the conical bottom section 7 itself through perforations therein (not shown) or opening 9. When gas is introduced through perforations in bottom 7, element 5 aids in the distribution of the gases in the contact or reaction chamber. When angle D is equal to approximately the dynamic angle of repose of the solid material flowing through the reaction chamber, stagnation of the pebbles around element 5 is prevented and uniform flow is achieved. Even though angle B (the angle of slope) is equal to approximately the static angle of repose, the pebbles flow continuously and uniformly without stagnation to opening 9. In order that opening 9 be the only limiting restriction on the flow of the pebbles from the reaction chamber of Figure 1, the distance of the apex 6 of the lower cone of element 5 from conical bottom 7 must be at least equal to the diameter of the opening 9. Otherwise, the opening between apex 6 and the conical bottom 7 would be more limited than opening 9 and itself restrict the flow of the pebbles from the reaction chamber.

This invention has been described with respect to a vessel of cylindrical sides and conical bottom; however the general principles involved can be applied as well to any shaped vessel with a centrally perforated pyramidal bottom.

This invention is particularly useful in the thermal type or cracking furnace in which hot pebbles are moved in the reaction zone countercurrently to the flow of hydrocarbon gases being cracked. High temperatures and short residence time are desirable to obtain a maximum percent cracking and minimum polymerization of the cracked product. By the use of the flow deflector of this invention the length of the collection or bottom section is shortened, the effective length of the chamber is reduced, and the flow of pebbles is maintained uniform and continuous so that the hydrocarbon gases are contacted with the pebbles of substantially the same temperature and heat content throughout any cross-sectional area in the vessel and the pressure drop through the chamber is reduced.

Typical beaded silica-alumina catalysts having a diameter of about 0.1 to 0.2 inch have a static angle of repose of about 34° and a dynamic angle of repose of about 71°. Granular substances have various angles of repose depending on such factors as size, chemical and physical properties, etc. The angles of repose of different substances are available in the literature and are known to those skilled in the art. Knowing both the static and dynamic angles of repose, a chamber of optimum size and characteristics can be constructed according to this invention adaptable to the continuous and uniform flow of the particular granular substance through the chamber.

Various alterations and modifications of the present apparatus may become apparent to those skilled in the art without departing from the scope of this invention.

I claim:

1. A pebble heater reactor particularly adapted to hydrocarbon conversion reactions involving cracking and carbon deposition comprising in combination a vertical unobstructed cylindrical section; a top closure member for said section having a pebble inlet therein; gas inlet and outlet conduits connecting with the lower and upper portions, respectively, of said section; a bottom closure member for said section in the form of a funnel or cone having a slope of 34° and terminating at its lower end in an axially positioned circular pebble outlet and connecting at its upper end with the lower end of said cylindrical section; and, as the sole pebble flow control device within said reactor, a flow control member in the form of a pair of opposed cones having a common horizontal base disposed axially at the level of the confluence of said cylindrical section and said bottom closure member, the apex of the lower cone being disposed axially at a distance from the conical bottom equal to the diameter of said pebble outlet and the apex angles of said cones being 38°.

2. A method of effecting contact between a gas and a gravitating compact mass of pebbles under uniform pebble flow conditions in heat-exchange relationship which comprises gravitating a compact mass of pebbles vertically through the major portion of a substantially unobstructed closed upright cylindrical zone; at a point on the axis of said cylindrical zone and above the level of the lower end thereof, deflecting the gravitating pebbles in the proximity of said point outwardly at an angle of 71° with the horizontal to the level of the lower end of said cylindrical zone and at said level deflecting all of the pebbles inwardly at an angle ranging from 34° at the periphery to an angle of 71° with the horizontal at the innermost part of the column so as to direct the pebbles uniformly toward an axial outlet zone, the foregoing steps cooperating to effect substantially uniform vertical pebble flow through said cylindrical zone; and passing a gas at a different temperature from that of said pebbles upwardly through said cylindrical zone in the direct contact and in heat-exchange relation with said pebbles.

3. The process of claim 2 in which the pebbles are at a higher temperature than said gas when introduced to said cylindrical zone.

4. The process of claim 2 in which said gas is a hydrocarbon gas and the pebbles are introduced to said cylindrical zone at a temperature above the cracking temperature of the gas.

HAROLD H. MORSE.

REFERENCES CITED

The following references are of record in the file of this patent:

UNITED STATES PATENTS

| Number | Name | Date |
|---|---|---|
| 1,709,351 | Jones | Apr. 16, 1929 |
| 2,387,378 | Wolk | Oct. 23, 1945 |
| 2,400,194 | Day et al. | May 14, 1946 |
| 2,430,669 | Crowley, Jr. | Nov. 11, 1947 |